United States Patent
Kodama

(10) Patent No.: US 9,954,281 B2
(45) Date of Patent: Apr. 24, 2018

(54) ANTENNA DEVICE AND PORTABLE INFORMATION TERMINAL

(71) Applicant: Sony Computer Entertainment Inc., Tokyo (JP)

(72) Inventor: Kenichiro Kodama, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 14/435,476

(22) PCT Filed: Oct. 24, 2012

(86) PCT No.: PCT/JP2012/077502
§ 371 (c)(1),
(2) Date: Apr. 14, 2015

(87) PCT Pub. No.: WO2014/064786
PCT Pub. Date: May 1, 2014

(65) Prior Publication Data
US 2015/0270610 A1    Sep. 24, 2015

(51) Int. Cl.
*H01Q 1/24*     (2006.01)
*H01Q 5/35*     (2015.01)
*H01Q 9/04*     (2006.01)
*H01Q 5/328*    (2015.01)
*H04W 88/02*    (2009.01)

(52) U.S. Cl.
CPC .............. *H01Q 5/35* (2015.01); *H01Q 1/243* (2013.01); *H01Q 5/328* (2015.01); *H01Q 9/0421* (2013.01); *H04W 88/02* (2013.01)

(58) Field of Classification Search
USPC .......................... 343/702, 700 MS, 750, 860
See application file for complete search history.

(56) References Cited

U.S. PATENT DOCUMENTS

| 6,133,879 A | 10/2000 | Grangeat |
| 6,255,994 B1 | 7/2001 | Saito |

(Continued)

FOREIGN PATENT DOCUMENTS

| CN | 1230037 A | 9/1999 |
| CN | 101388494 A | 3/2009 |

(Continued)

OTHER PUBLICATIONS

International Preliminary Report on Patentability and Written Opinion for corresponding PCT application No. PCT/JP2012/077502, dated Apr. 30, 2015.

(Continued)

*Primary Examiner* — Jessica Han
*Assistant Examiner* — Hai Tran
(74) *Attorney, Agent, or Firm* — Matthew B. Dernier, Esq.

(57) ABSTRACT

An antenna device includes a feed terminal configured to feed a first radio-frequency signal at one end part of an antenna element having both end parts, a feed terminal capable of feeding a second radio-frequency signal concurrently with the first radio-frequency signal at the other end part, and a grounding terminal configured to connect to a grounding point at a substantially center part. Based on this, signals in plural frequency bands are allowed to be concurrently used in common in one antenna element.

10 Claims, 14 Drawing Sheets

(56) References Cited

U.S. PATENT DOCUMENTS

| | | | |
|---|---|---|---|
| 6,734,825 B1 | 5/2004 | Guo | |
| 7,450,072 B2 * | 11/2008 | Kim | H01Q 1/243 343/700 MS |
| 7,511,668 B2 | 3/2009 | Hirabayashi | |
| 2002/0044100 A1 | 4/2002 | Jagielski | |
| 2004/0080457 A1 | 4/2004 | Guo | |
| 2005/0174291 A1 * | 8/2005 | Inatsugu | H01Q 1/325 343/700 MS |
| 2006/0152429 A1 | 7/2006 | Pan | |
| 2006/0208949 A1 | 9/2006 | Hirabayashi | |
| 2011/0128206 A1 * | 6/2011 | Wakabayashi | H01Q 7/005 343/860 |
| 2012/0262342 A1 | 10/2012 | Lee | |
| 2013/0222186 A1 * | 8/2013 | Leung | H01Q 1/521 343/700 MS |

FOREIGN PATENT DOCUMENTS

| | | |
|---|---|---|
| DE | 60024225 T2 | 8/2006 |
| EP | 1137192 A1 | 9/2001 |
| EP | 2360787 A2 | 8/2011 |
| JP | 63133703 A | 6/1988 |
| JP | 2000114856 A | 4/2000 |
| JP | 2001345625 A | 12/2001 |
| JP | 2001352260 A | 12/2001 |
| JP | 2004048471 A | 2/2004 |
| JP | 2004159202 A | 6/2004 |
| JP | 2005184565 A | 7/2005 |
| JP | 2006504328 A | 2/2006 |
| JP | 2008199204 A | 8/2008 |
| JP | 2008294635 A | 12/2008 |
| JP | 2012161002 A | 8/2012 |
| TW | 200826370 A | 6/2008 |
| TW | 200826730 A | 6/2008 |
| WO | 2004038858 A1 | 5/2004 |

OTHER PUBLICATIONS

Office Action for corresponding JP Patent Application No. 2014-543064, pp. 1-13, dated Oct. 13, 2015.

International Search Report for corresponding PCT application No. PCT/JP2012/077502, dated Jan. 8, 2013.

Office Action for corresponding CN Patent Application No. 201280076477.7, pp. 1-15, dated Feb. 15, 2017.

Office Action for corresponding CN Patent Application No. 201280076477.7, pp. 1-16, dated Jun. 3, 2016.

* cited by examiner (a)

(b)

(c)

(a)

(b)

(a)

(b)

(a)

(b)

(a)

(b)

(b)

(a)

(b)

(c)

(a)

(b)

ANTENNA DEVICE AND PORTABLE INFORMATION TERMINAL

TECHNICAL FIELD

The present invention relates to an antenna device that allows concurrent use of plural frequencies and a portable information terminal equipped with this antenna device.

BACKGROUND ART

A large number of multi-frequency antennas used in portable information terminals have been proposed. For example, PTL 1 discloses a multi-frequency antenna having a pair of antenna elements that radiate radio waves with frequencies f1 and f2 different from each other (f2>f1) and a feed line that feeds these antenna elements. In this multi-frequency antenna, a tip-opened line that grounds the feed line in a high-frequency manner at the higher frequency f2 is provided between the pair of antenna elements. According to this multi-frequency antenna, excitation of a predetermined frequency by the antenna element of another frequency is prevented and the desired characteristics of the directivity in the horizontal plane can be achieved.

Furthermore, the following dual-band antenna is disclosed in PTL 2. Specifically, a pair of antenna elements of $\lambda a$ (wavelength of operating frequency)/4 are disposed on the same straight line along the vertical direction to form a dipole antenna around $\lambda a$. In addition, the lower antenna element is formed into a strip shape and it is employed as a ground plate of the upper antenna element to form an inverted-F antenna around $\lambda b$ (wavelength shorter than $\lambda a$). The operating frequency band corresponding to $\lambda a$ is 900 to 930 [MHz] and the operating frequency band corresponding to $\lambda b$ is set to 1.85 to 1.99 [GHz].

In this dual-band antenna, a coaxial cable is connected to each of the antenna element of $\lambda a$ and the antenna element of $\lambda b$ and therefore radio waves of $\lambda a$ and radio waves of $\lambda b$ are transmitted and received as radio-frequency signals independent of each other. Furthermore, because the lower dipole antenna element is used also as the ground plate, the number of constituent components is reduced. Moreover, a trap that resonates at $\lambda b$ is provided close to the connecting point between the core line of the coaxial cable that feeds the radio-frequency signal of $\lambda b$ and the antenna element of $\lambda b$ to prevent the radio-frequency signal of $\lambda b$ from leaking into the radio-frequency circuit of $\lambda a$. This allows transmission/reception of radio waves of $\lambda a$ by the dipole antenna and transmission/reception of radio waves of $\lambda b$ by the inverted-F antenna to be carried out independently of each other.

CITATION LIST

Patent Literatures

[PTL 1] JP 2004-159202 A [PTL 2] JP 2001-345625 A

SUMMARY

Technical Problem

The multi-frequency antenna disclosed in PTL 1 has an advantage that radio-frequency signals of plural frequencies can be used in common. However, it is impossible to simultaneously feed the radio-frequency signals of the plural frequencies. In contrast, the dual-band antenna disclosed in PTL 2 allows simultaneous feeding. However, the ground plate for grounding, the inverted-F antenna, a setting point, and the trap need to be provided, which makes the antenna structure complicated.

In recent years, portable information terminals equipped with WLAN (Wireless Local Area Network) and BT (Bluetooth (registered trademark)) have also appeared. The operating frequency of WLAN is 2400 to 2483.5 [MHz]. Furthermore, the operating frequency of BT is 2402 to 2480 [MHz]. Therefore, one antenna can be shared as long as they are separately operated. However, in the case of simultaneously operating the WLAN and BT, an antenna needs to be provided for each of them. Alternatively, an antenna with a structure like the dual-band antenna disclosed in PTL 2 needs to be employed.

However, if an antenna for WLAN and an antenna for BT are separately provided, the interference between the antennas becomes an issue. Therefore, the antennas are so deigned that the distance between the antennas is set as long as possible. Also in the case of the dual-band antenna disclosed in PTL 2, a sufficient antenna volume becomes large and the influence on the design of a portable information terminal in which it is incorporated becomes large.

A problem of the present invention is to provide an antenna device that is free from interference even when radio-frequency signals of plural frequencies are simultaneously fed and allows size reduction.

Another problem of the present invention is to provide a portable information terminal that allows a saving of the antenna placement area.

Solution to Problem

An antenna device of the present invention has an antenna element having both end parts, a first feed terminal that is provided at one end part of the antenna element and is to feed a first radio-frequency signal, a second feed terminal that is provided at the other end part of the antenna element and is capable of feeding a second radio-frequency signal different from the first radio-frequency signal concurrently with the first radio-frequency signal, and a grounding terminal that is provided at a substantially center part of the antenna element and is to connect to a grounding point.

The first radio-frequency signal and the second radio-frequency signal may be radio-frequency signals in the same frequency band. The antenna element is formed into a meander shape for example.

In a certain embodiment, the antenna element is placed at a predetermined site on a circuit board that is incorporated in a portable information terminal and has a ground surface and an electronic component-mounted surface for example. Furthermore, the grounding terminal electrically communicates with the ground surface. The first feed terminal electrically communicates with a first site on the electronic component-mounted surface, and the second feed terminal electrically communicates with a second site separate from the first site by the size of the antenna element in the longitudinal direction on the electronic component-mounted surface.

In another embodiment, in the antenna device, a grounded element electrically communicating with the ground surface is formed from the first feed terminal on the same plane as the plane of the antenna element and in the opposite direction to the second feed terminal. Alternatively, an element for another frequency that resonates with another frequency is formed from the first feed terminal on the same plane as the plane of the antenna element and in the opposite direction to the second feed terminal.

In another embodiment, the antenna element is placed at a predetermined angle with respect to the circuit board. For example, the antenna element is placed on the same plane as the plane of the circuit board. The ground surface is formed on the circuit board, and the antenna element is a film-shaped pattern antenna formed on the same plane as the plane of the ground surface and on the circuit board. A reactance element configured to change the electrical length to the first feed terminal or the second feed terminal may intervene between the grounding terminal and the ground surface. In this case, the reactance of the reactance element may be variable.

A portable information terminal of the present invention includes a portable casing allowed to be held by an operator with a single hand and a circuit board on which an electronic circuit including a first communication circuit and a second communication circuit configured to carry out communication in communication forms different from each other is mounted. A ground surface is formed on the circuit board. The portable information terminal further includes an antenna device capable of being simultaneously fed with a first radio-frequency signal from the first communication circuit and a second radio-frequency signal from the second communication circuit.

The antenna device has an antenna element having both end parts, a first feed terminal that is provided at one end part of the antenna element and is to feed the first radio-frequency signal, a second feed terminal that is provided at the other end part of the antenna element and is capable of feeding the second radio-frequency signal different from the first radio-frequency signal concurrently with the first radio-frequency signal, and a grounding terminal that is provided at a substantially center part of the antenna element and is to connect to a grounding point.

Advantageous Effect of Invention

According to the present invention, one antenna element can be shared as antennas for transmission and reception of plural radio-frequency signals. Thus, the antenna size can be reduced. In addition, by equipping a portable information terminal with this antenna device, the antenna placement area of the portable information terminal can be saved.

DESCRIPTION OF EMBODIMENTS

Embodiment examples of the present invention will be described below with reference to the drawings.

First Embodiment

Figure 1:
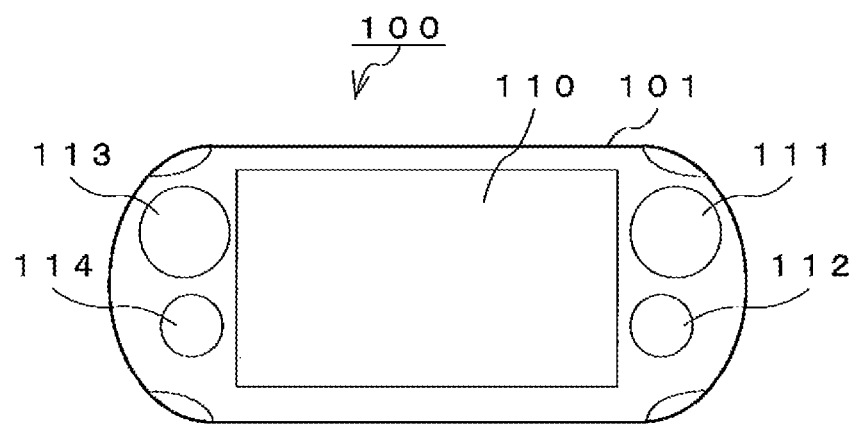
FIG. 1 is an appearance diagram of a portable information terminal according to a first embodiment: (a) is a front view, (b) is a back view, and (c) is a top view.
Figure 1:
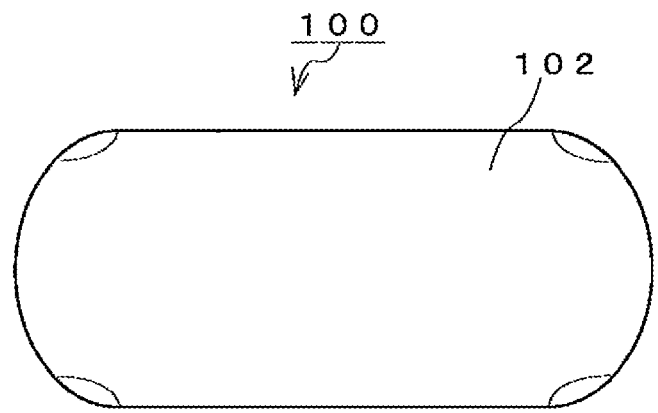
Figure 1:
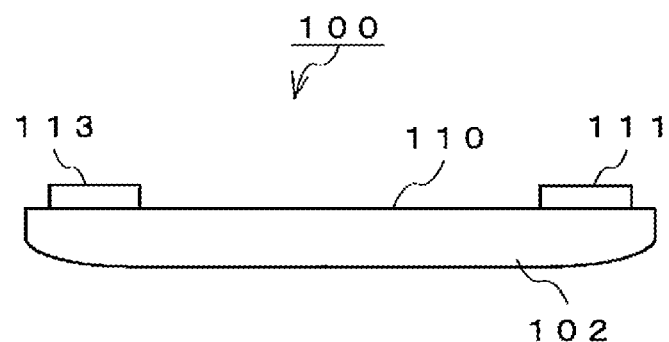

FIG. 1 is an appearance diagram of a portable information terminal according to a first embodiment: (a) is a front view, (b) is a back view, and (c) is a top view.

This portable information terminal 100 has a casing that can be held by an operator with a single hand. This casing is composed of a front-side casing 101 and a back-side casing 102. A display panel 110 is provided at the substantially center part of the front-side casing 101. The display panel 110 is a panel obtained by stacking a touch screen over a liquid crystal display. Furthermore, the front-side casing 101 is provided with operation buttons 111 and 112 operated with the right hand when the operator holds the casing with the left hand and operation buttons 113 and 114 operated with the left hand when the operator holds the casing with the right hand. While viewing the display panel 110, the operator holds the casing with a single hand, and carries out touch operation of the display panel 110 and operates the respective operation buttons 111 to 114 with fingers of the other single hand. This is a general operation form.

Figure 2:
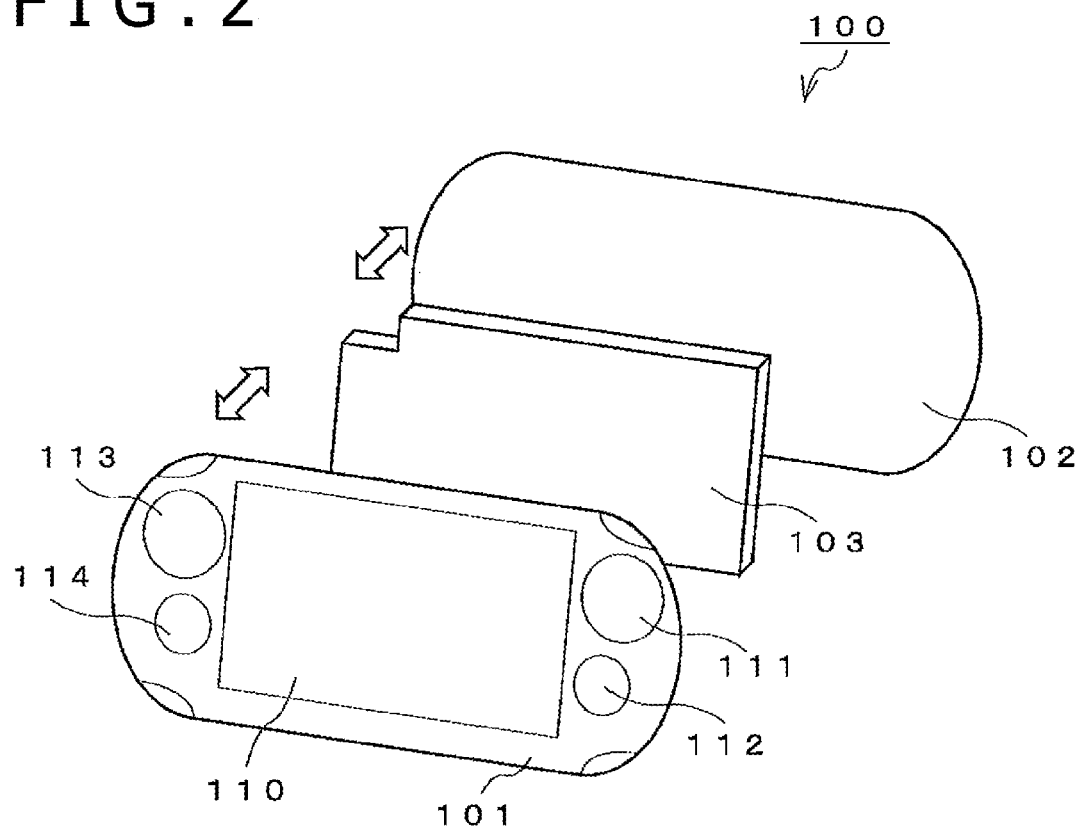
FIG. 2 is an exploded perspective view of the portable information terminal.

FIG. 2 is an exploded perspective view of this portable information terminal 100. In the portable information terminal 100, a circuit board 103 is incorporated between the front-side casing 101 and the back-side casing 102. The front side of this circuit board 103 includes an electronic component-mounted surface and the back side thereof includes a ground surface.

Figure 3:
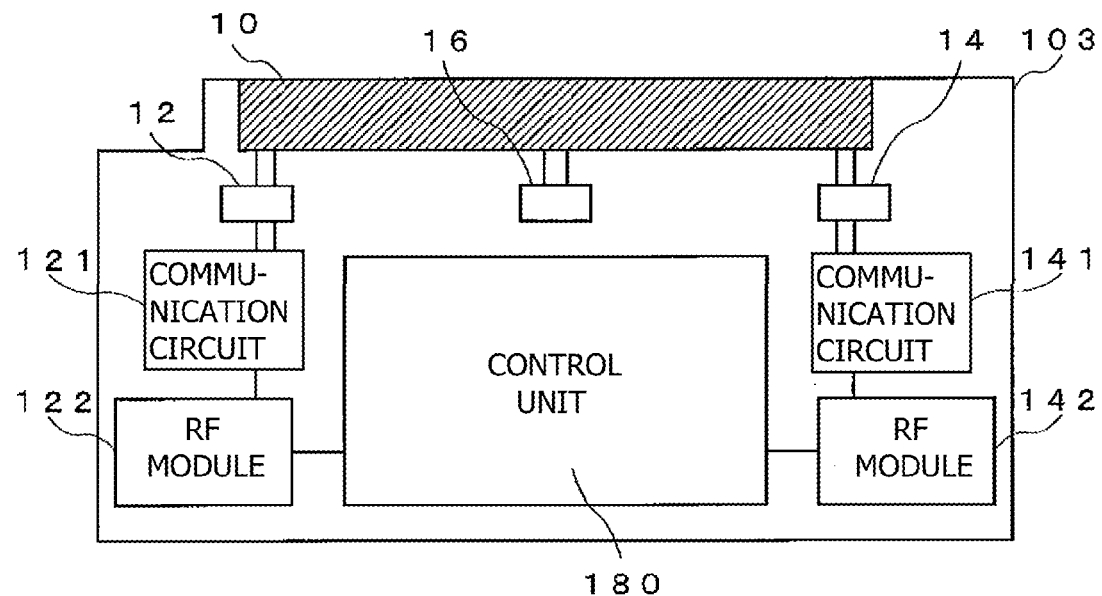
FIG. 3($a$) is an explanatory diagram of a mounting example of electronic components on an electronic component-mounted surface of a circuit board and FIG. 3($b$) is an explanatory diagram of a mounting example of the back surface side of the circuit board.
Figure 3:
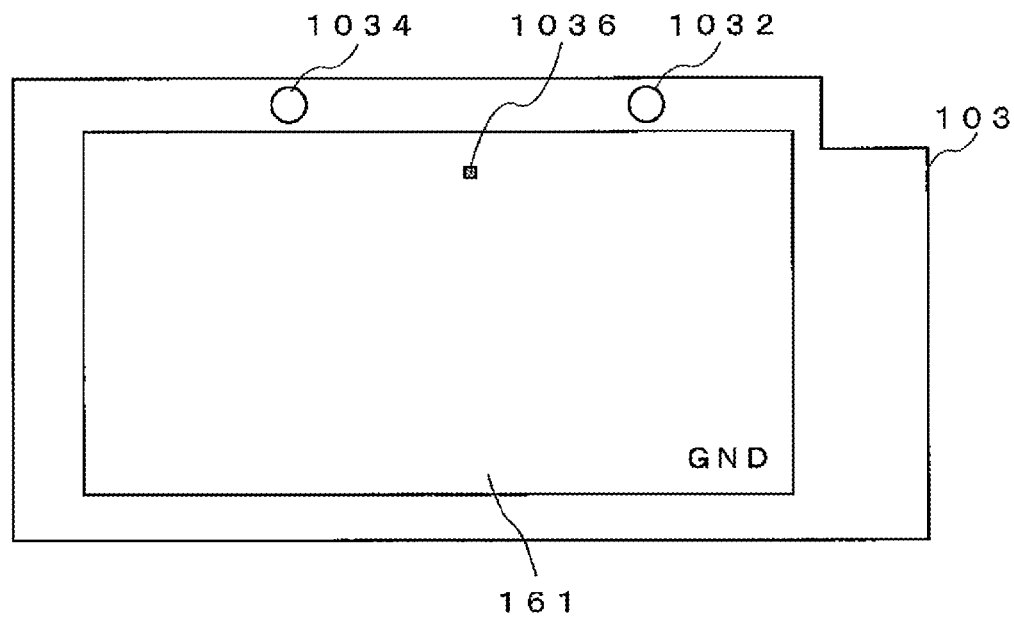

A mounting example of electronic components on the electronic component-mounted surface of this circuit board 103 is shown in FIG. 3(*a*). Referring to this diagram, at predetermined sites on the electronic component-mounted surface of the circuit board 103, an antenna device 10, and a pair of feed terminals 12 and and a grounding terminal 16 that are associated with this antenna device 10 are provided. The antenna device 10 has a casing with a predetermined shape. Resin having a rectangular shape is provided inside this casing and one antenna element having both end parts is formed on this resin. The dielectric constant of the resin may be any in view of obtaining the desired electrical length size and is e.g. about "4.3."

One feed terminal 12 is connected to one end part of this antenna element. The other feed terminal 14 is connected to the other end part of the antenna element. The grounding terminal 16 is connected to the substantially center part of the antenna element.

A communication circuit 121 for WLAN is connected to the feed terminal 12. A communication circuit 141 for BT is connected to the feed terminal 14. These feed terminals 12 and 14 are terminals that can be concurrently supplied from the respective communication circuits 121 and 141. The respective communication circuits 121 and 141 are so configured as to include a matching circuit for impedance matching. A control unit 180 is connected to the respective communication circuits 121 and 141 via corresponding RF (radio-frequency) modules 122 and 142, respectively.

At the time of transmission, the RF modules 122 and 142 modulate a radio-frequency signal and lead a modulated signal obtained by this to the feed terminals 12 and 14. At the time of reception, the RF modules 122 and 142 receive a radio-frequency signal from the feed terminals 12 and 14. The control unit 180 controls the above-described operation of the RF modules 122 and 142.

To prevent the radio-frequency signal from coming around, the RF module 122 is placed at a site separate from the placement site of the RF module 142 by the size of the antenna element or longer.

A mounting example on the back surface side of the circuit board 103 is shown in FIG. 3(*b*). Referring to this diagram, a ground surface (GND) 161 is formed on the back surface of the circuit board 103 and a grounding point of this ground surface 161 electrically communicates with the above-described grounding terminal 16 via a spring contact 1036. At the upper end part of the circuit board 103 except for the ground surface 161, a pair of spring contacts 1032 and 1034 are provided. One spring contact 1032 electrically communicates with the feed terminal 12. The other spring contact 1034 electrically communicates with the feed terminal 14.

In this manner, the respective terminals 12, 14, and 16 of the antenna device 10 are connected to the circuit board 103 via the spring contacts 1032, 1034, and 1036. This facilitates mounting and prevents contact failure and so forth when an impact is applied after the mounting.

Figure 4:
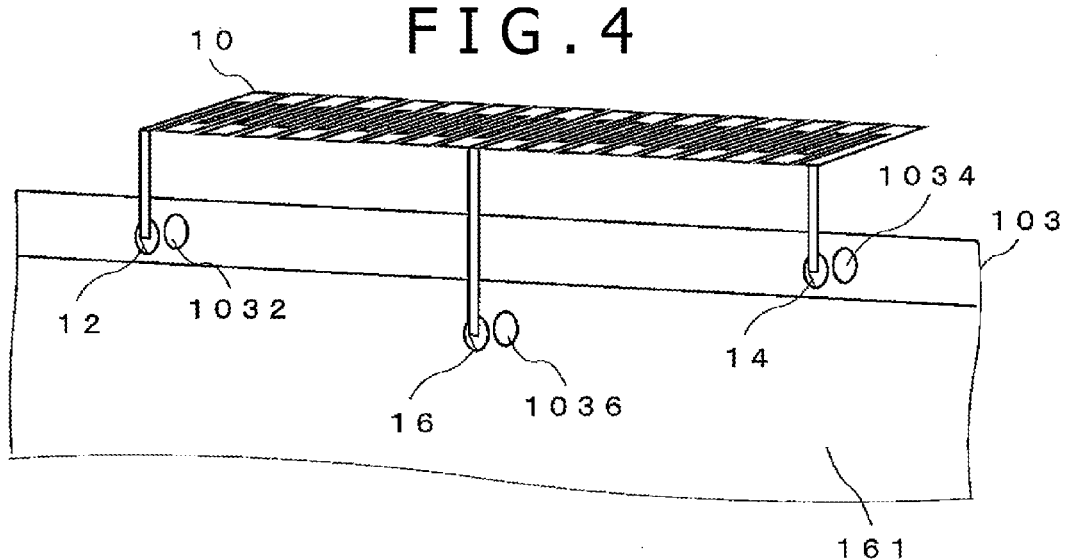
FIG. 4 is a diagram showing a shape example of an antenna element an antenna device has.

A shape example of the antenna element the antenna device 10 has is shown in FIG. 4. In FIG. 4, the above-described casing and resin are omitted. An antenna element 11 of the present embodiment is one having a meander shape and its main surface is placed at a predetermined angle with respect to the circuit board 103. In the example shown in the diagram, the main surface is placed at an angle of almost 90 degrees with respect to the circuit board 103. The above-described feed terminal 12 extends in parallel to the circuit board 103 from one end part of this antenna element 11. Furthermore, the above-described feed terminal 14 extends in parallel to the circuit board 103 from the other end part of this antenna element 11. The grounding terminal 16 extends in parallel to the circuit board 103 from the substantially center part of the antenna element 11. In mounting, the respective terminals 12, 14, and 16 are mounted to the respective spring contacts 1032, 1034, and 1036 from the back surface side of the circuit board 103.

Figure 5:
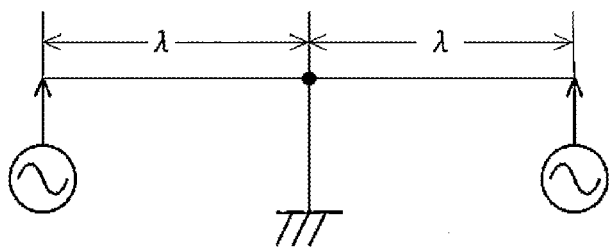
FIG. 5 is a diagram representing the size of the antenna element.

FIG. 5 is a diagram representing the size of the antenna element 11. The electrical length of the antenna element is about $2\lambda$ [mm] of the operating frequency between the feed terminals 12 and 14. "$\lambda$" denotes the wavelength. Because the operating frequency band of WLAN and BT is 2.4 [GHz] to 2.5 [GHz] and the wavelength $\lambda$ is 125 [mm], the electrical length of the antenna element is 250 [mm]. However, by forming the antenna element into the meander shape, the physical length in the longitudinal direction is shortened to about 50 [mm]. The grounding terminal 16 is connected to a site around the center part ($\lambda$ [mm]) of the antenna element.

The electrical length of the antenna element is $2\lambda$ [mm] in a free space. However, by using ABS resin (Acrylonitrile-Butadiene-Styrene copolymer synthetic resin), which has a comparatively-high dielectric constant, or the like as the above-described resin, an antenna element having a shorter electrical length than in the free space can be formed due to the wavelength shortening effect.

Figure 6:
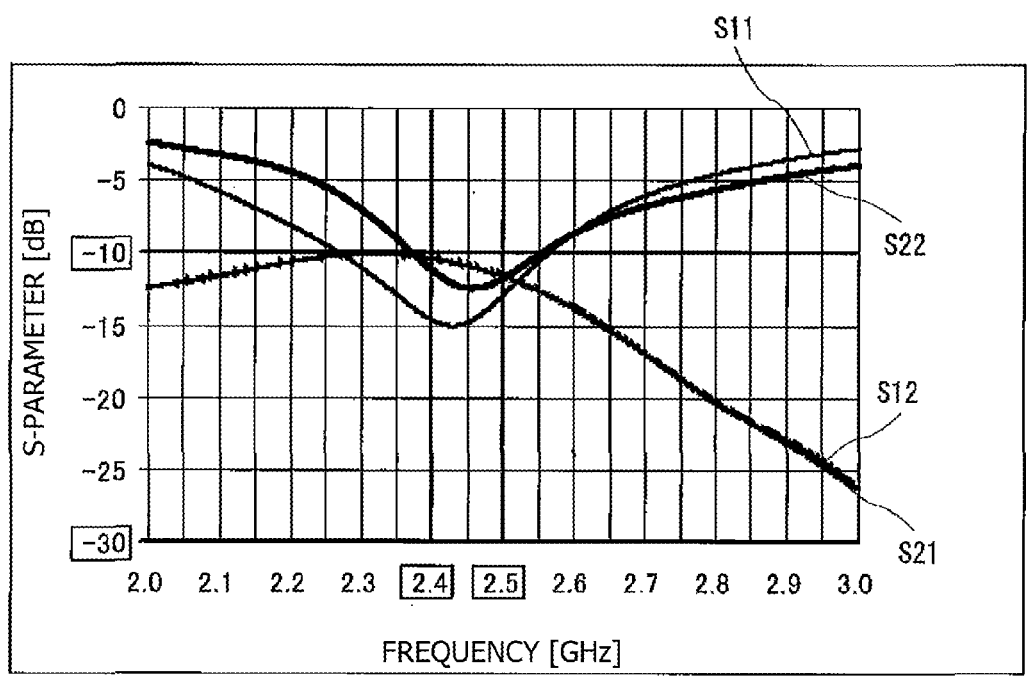
FIG. 6 is a characteristic diagram of the return loss and isolation of the antenna device according to the first embodiment.

A characteristic diagram of the return loss and isolation of the antenna device 10 formed in the above-described manner is shown in FIG. 6. In FIG. 6, the ordinate is the S-parameter (dB) and the abscissa is the frequency [GHz].

In the S-parameter, S11 is a logarithmic function (10 log [10]) of power that returns without being transmitted/power transmitted to the antenna element 11 when electromagnetic waves are transmitted from the feed terminal 14. S22 is a logarithmic function (10 log [10]) of power that returns without being transmitted/power transmitted to the antenna element 11 when electromagnetic waves are transmitted from the feed terminal 12. That is, they represent the return loss of the respective feed terminals 12 and 14.

Furthermore, S12 is signal detected by the feed terminal 14/power transmitted from the feed terminal 12 to the element 11 when the signal from the feed terminal 14 is set to zero. S21 is signal detected by the feed terminal 12/power transmitted from the feed terminal 14 to the element 11 when the signal from the feed terminal 12 is set to zero. That is, they represent the isolation.

In 2.4 [GHz] to 2.5 [GHz] as the operating frequency band, the return losses (S11 and S22) are both equal to or lower than −10 [dB] and −10 [dB] or lower is ensured also as the isolation (S12 and S21). Therefore, it could be confirmed that the parameters were in sufficient ranges practically.

As above, it turns out that the right half and left half of the antenna element 11 each independently operate, with the site connected to the grounding terminal 16 being the center, due to the connecting of the antenna element 11 to the grounding terminal 16 (ground surface 161) at the center of the antenna element 11 (around $\lambda/2$).

It has been confirmed that the current when the antenna element 11 is fed from the feed terminal 12 hardly flows to the side of the feed terminal 14, although diagrammatic representation is omitted. Similarly, it has also been confirmed that the current when the antenna element 11 is fed from the feed terminal 14 hardly flows to the side of the feed terminal 12.

Furthermore, when the center part of the antenna element 11 was not grounded, the isolation greatly deteriorated to about −3 [dB] because the current fed from the feed terminal 12 flew to the side of the feed terminal 14 via the antenna element 11, and vice versa.

As above, in the antenna device 10 of the first embodiment, the substantially center part of one antenna element 11 having both end parts is grounded and concurrent feeding of radio-frequency signals from its both end parts is allowed. Thus, the antenna size can be reduced with ensuring of the antenna performance. By equipping the portable information terminal 100 with this antenna device 10, the antenna placement area of the portable information terminal 100 also becomes around 50 [mm]. This allows placing of antenna devices in a number according to frequencies used and enables significant saving compared with the case of using the conventional multi-frequency antenna.

Reducing the size of the antenna device 10 as in the first embodiment also enables contribution in terms of the design of the portable information terminal 100.

Furthermore, the radio-frequency signals fed to both end parts in the same frequency band can be fed without mutual interference. Thus, the use purposes of the antenna device 10 can be expanded compared with the case of using radio-frequency signals in frequency bands different from each other.

Moreover, the antenna element 11 is placed at a predetermined site on the circuit board 103, which is incorporated in the portable information terminal 100 and has the ground surface 161 and the electronic component-mounted surface, and the grounding terminal 16 electrically communicates with the ground surface 161. Furthermore, the feed terminal 12 electrically communicates with a mounting site (first site) on the electronic component-mounted surface and the feed terminal 14 electrically communicates with a second site separate from the first site by the size of the antenna element 11 in the longitudinal direction on the electronic component-mounted surface. Thus, interference in concurrent use can be prevented.

Second Embodiment

Figure 7:
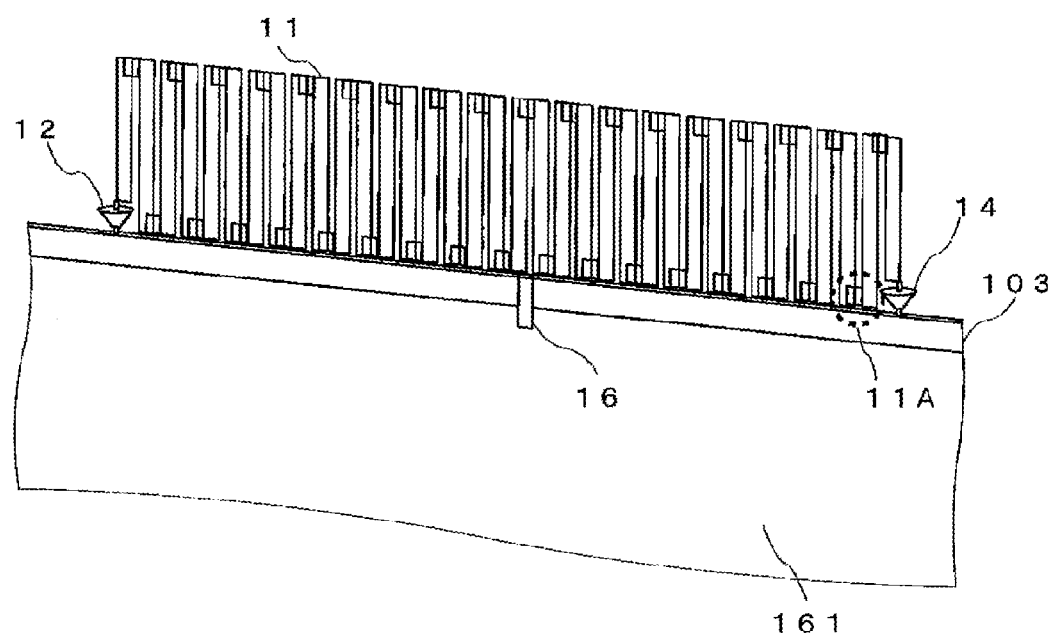
FIG. 7($a$) is an explanatory diagram of the structure of an antenna device according to a second embodiment and FIG. 7($b$) is a partially enlarged view.
Figure 7:
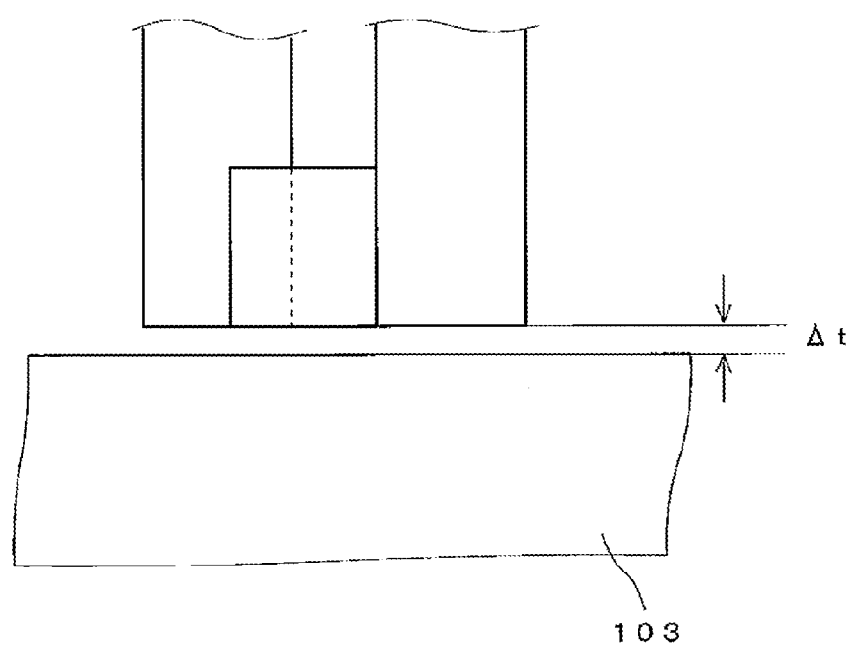

FIG. 7 is an explanatory diagram of the structure of an antenna device according to a second embodiment. The same constituent element as that in the first embodiment is given the same sign.

This embodiment is different from the antenna device of the first embodiment in that the antenna element 11 is placed on the same plane as that of the circuit board 103 as shown in FIG. 7(a). As shown in FIG. 7(b), which is a partially enlarged view of a proximity part 11A between the antenna element 11 and the circuit board 103 in FIG. 7(a), the antenna element 11 and the circuit board 103 are not in contact with each other but disposed at a certain interval Δt. Regarding this interval Δt, it has been confirmed by the present inventor that no problem is caused in practical use if the distance from the ground surface 161 is equal to or longer than 0.3 [mm].

Figure 8:
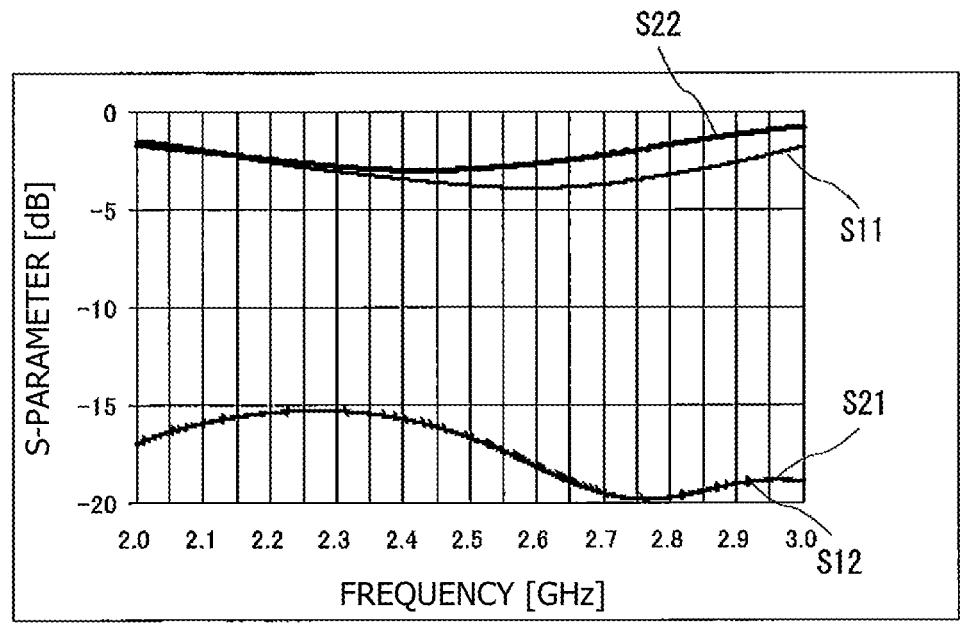
FIG. 8($a$) is a characteristic diagram of the return loss and isolation of the antenna device according to the second embodiment and FIG. 8($b$) is a characteristic diagram showing the radiation efficiency of this antenna device.
Figure 8:
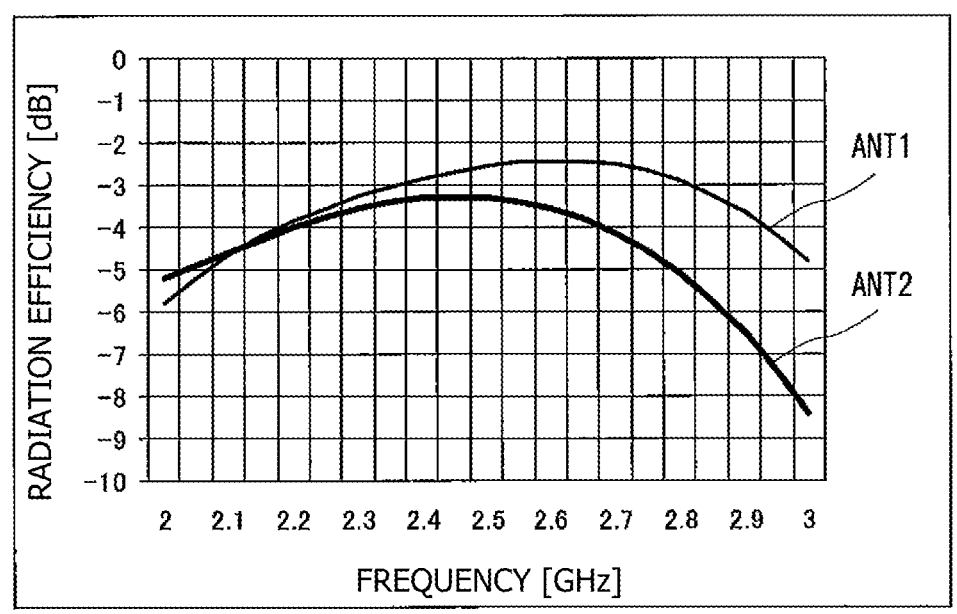

A characteristic diagram of the return loss and isolation of the antenna device according to this second embodiment is shown in FIG. 8(a). The ordinate and abscissa and the S-parameter are the same as those in FIG. 6. Furthermore, a characteristic diagram of the radiation efficiency of this antenna device is shown in FIG. 8(b). In FIG. 8(b), the ordinate is the radiation efficiency (dB) and the abscissa is the frequency [GHz]. ANT1 is the antenna (first antenna) when the antenna element 11 is viewed from the feed terminal 14 and ANT2 is the antenna (second antenna) when the antenna element 11 is viewed from the feed terminal 12.

In 2.4 [GHz] to 2.5 [GHz] as the operating frequency band, the return losses (S11 and S22) are both equal to or lower than −3 to −4 [dB] and the isolation (S12 and S21) is also favorable, specifically about −16 [dB]. Furthermore, in both the first antenna (ANT1) and the second antenna (ANT2), the radiation efficiency is around −3 [dB]. Therefore, it was confirmed that the parameters were in practical ranges as the antenna performance.

In the antenna device of this embodiment, the antenna element 11 is disposed on the same plane as that of the circuit board 103 with ensuring of practical antenna performance. Therefore, there is an advantage that the antenna element 11 can be formed by an electrically-conductive pattern on the circuit board 103. This allows contribution to achievement of a structure in which the bottom of the antenna device is set as the back surface and to further size reduction. Furthermore, the antenna element 11 does not protrude and thus the antenna device is organized also in view of the design.

Third Embodiment

Figure 9:
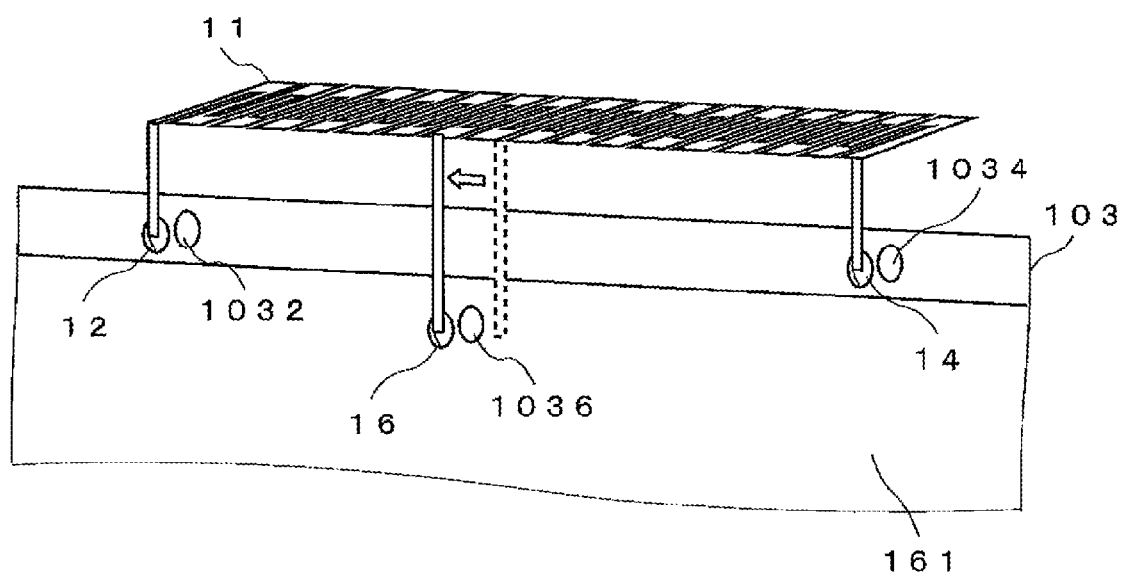
FIG. 9 is an explanatory diagram of the structure of an antenna device according to a third embodiment.

FIG. 9 is an explanatory diagram of the structure of an antenna device according to a third embodiment. The same constituent element as that in FIG. 4 described in the first embodiment is given the same sign.

The difference from the first embodiment is that the position of the grounding terminal 16 of the antenna device of the first embodiment, shown by a dashed line, is offset toward the feed terminal 12. This allows electromagnetic waves of different frequencies to be used in one antenna element 11 in common.

Regarding the offset amount, the element length of the first antenna (ANT1) formed with the electrical size between the feed terminal 14 and the grounding terminal 16 is set to such an amount that resonance can be obtained in band 1 (2.1 [GHz] band) of UMTS (Universal Mobile Telecommunications System). That is, the element length is set longer relatively. Furthermore, in the second antenna (ANT2) formed with the electrical size between the feed terminal 12 and the grounding terminal 16, such an element length that resonance is obtained in the 2.4 to 2.5 [GHz] band of WLAN and BT is set.

Figure 10:
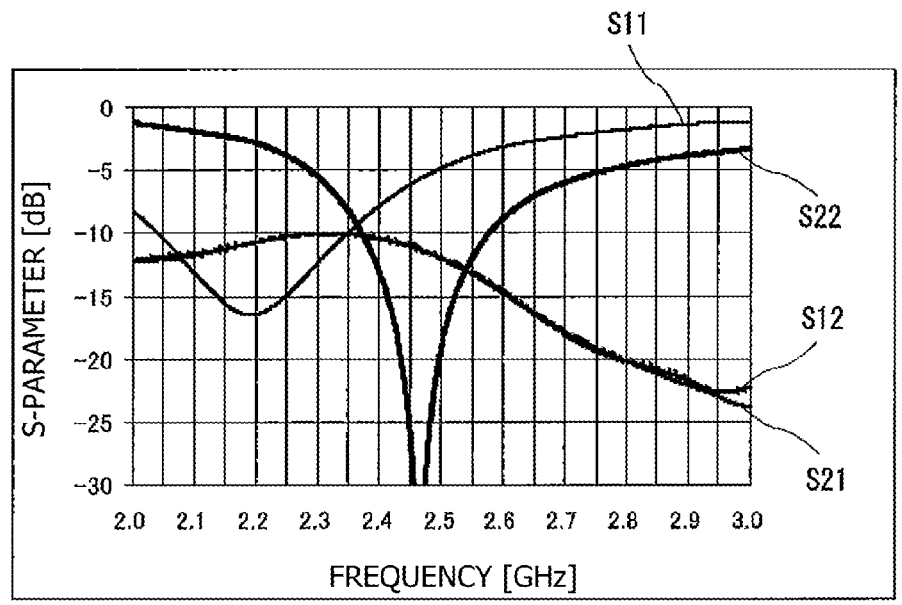
FIG. 10($a$) is a characteristic diagram of the return loss and isolation of the antenna device according to the third embodiment and FIG. 10($b$) is a characteristic diagram showing the radiation efficiency of this antenna device.
Figure 10:
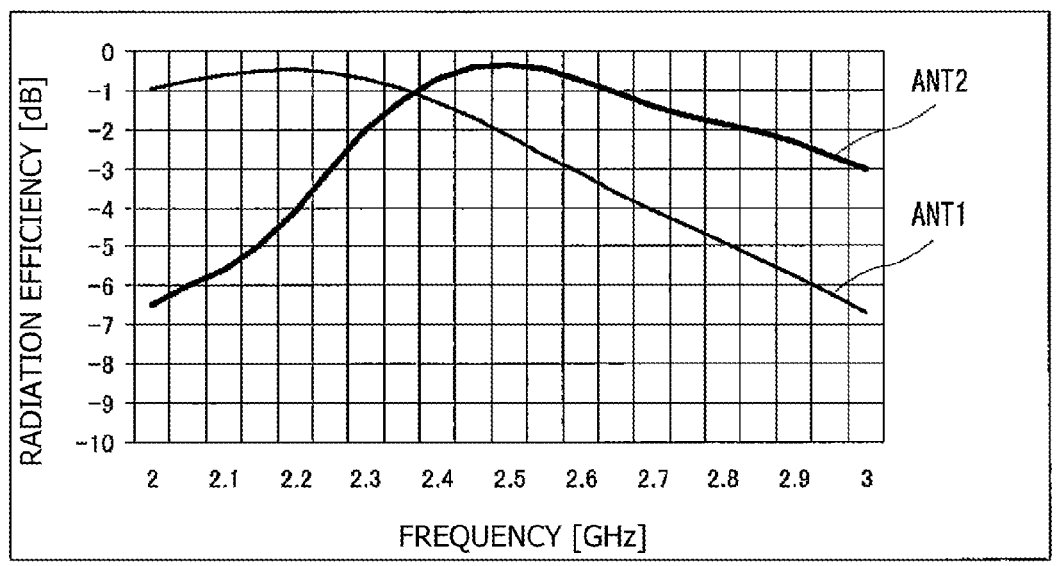

FIG. 10(a) is a characteristic diagram of the return loss and isolation of the antenna device according to this embodiment. Furthermore, FIG. 10(b) is a characteristic diagram showing the radiation efficiency of this antenna device. In the respective diagrams, the ordinate and abscissa, the S-parameter, and ANT1 and ANT2 are the same as those in FIGS. 8(a) and 8(b).

S11 in FIG. 10(a) is the return loss of the first antenna (ANT1) and S22 is the return loss of the second antenna (ANT2). As shown in the diagram, resonance is obtained at around 2.2 [GHz] in ANT1 and resonance is obtained at around 2.47 [GHz] in ANT2. Furthermore, the isolation (S12 and S21) in these operating frequency bands is equal to or lower than −10 [dB] and the radiation efficiency is equal to or higher than −1 [dB]. Therefore, it was confirmed that the parameters were in practical ranges as the antenna performance.

Fourth Embodiment

Figure 11:
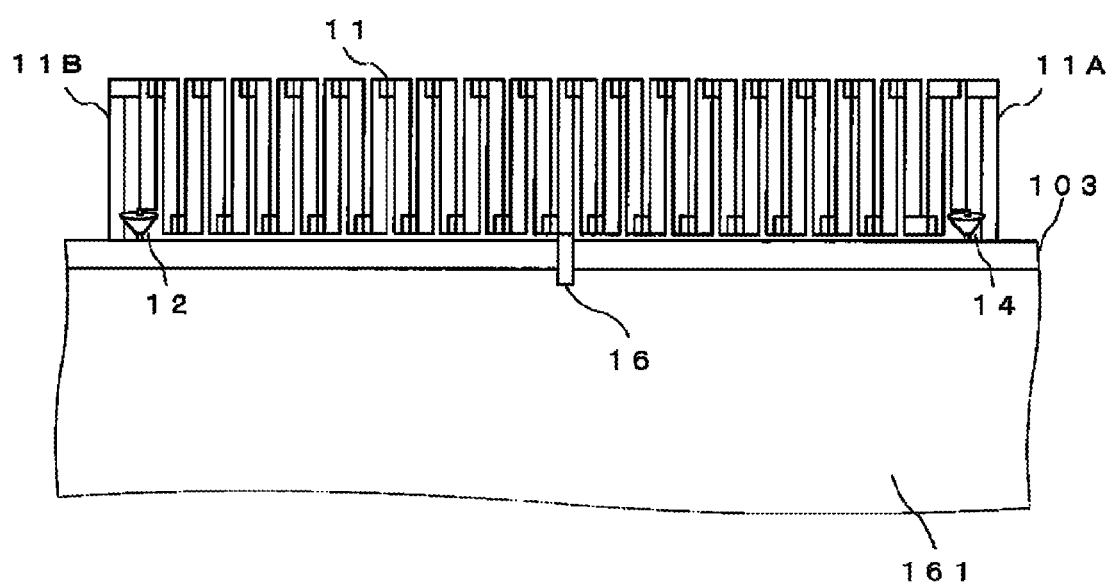
FIG. 11 is an explanatory diagram of the structure of an antenna device according to a fourth embodiment.

FIG. 11 is an explanatory diagram of the structure of an antenna device according to a fourth embodiment. The same constituent element as that in FIG. 4 described in the second embodiment is given the same sign. The antenna device of this embodiment is a device in which a grounded element 11A (11B) electrically communicating with the ground surface 161 is formed from the feed terminal 14 (12) on the same plane as that of the antenna element 11 and in the opposite direction to the feed terminal 12 (14). This allows this antenna device to function as two inverted-F antennas although having a planar shape.

Figure 12:
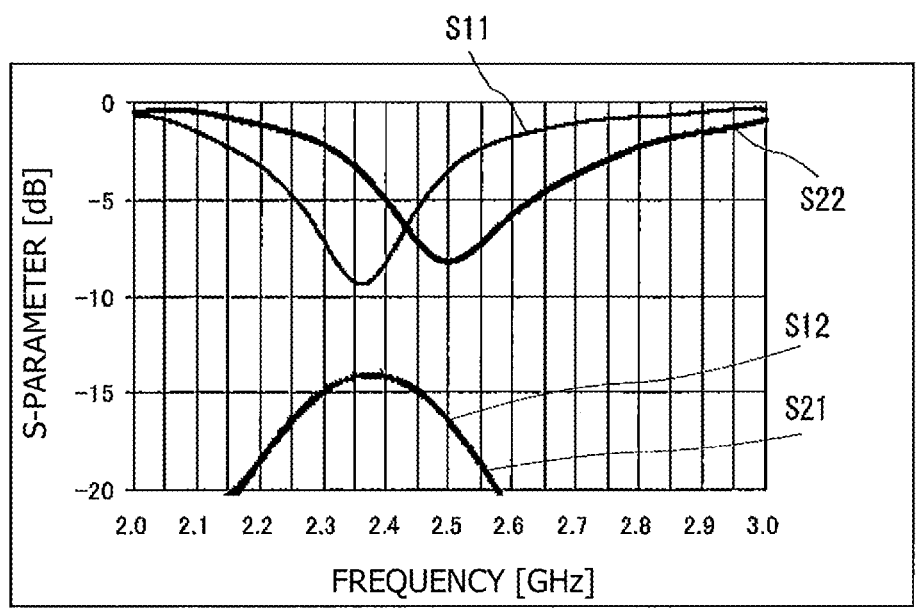
FIG. 12($a$) is a characteristic diagram of the return loss and isolation of the antenna device according to the fourth embodiment and FIG. 12($b$) is a characteristic diagram showing the radiation efficiency of this antenna device.
Figure 12:
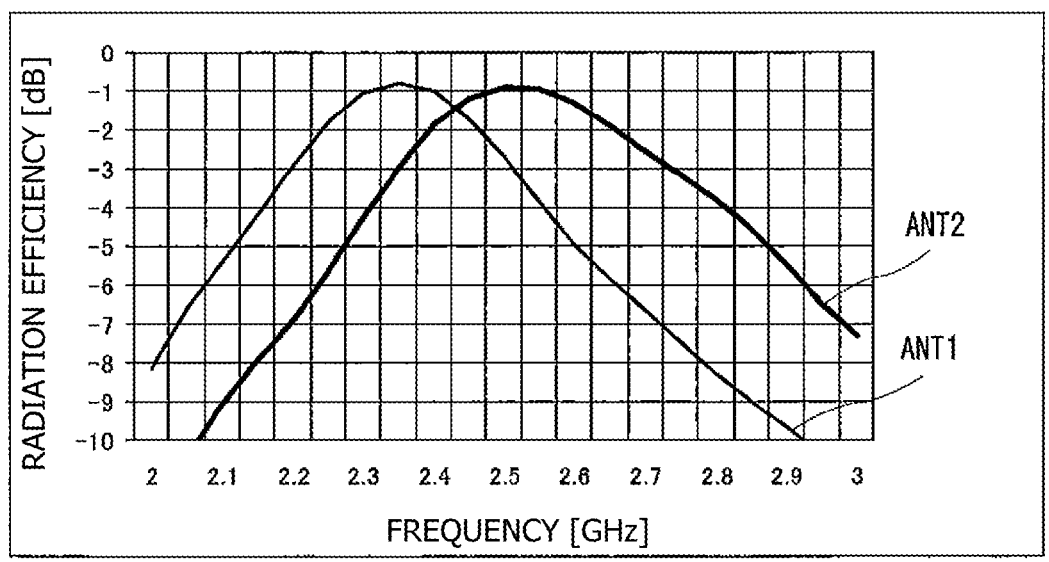

FIG. 12(a) is the return loss and isolation characteristics of the antenna device according to this embodiment. Furthermore, FIG. 12(b) is a diagram showing the radiation efficiency of this antenna device. In the respective diagrams, the ordinate and abscissa, the S-parameter, and ANT1 and ANT2 are the same as those in FIGS. 8(a) and 8(b).

As is apparent from these characteristic diagrams, the isolation is about −14 [dB] and the radiation efficiency is also −1 to −2 [dB]. Therefore, it was confirmed that sufficient performance could be ensured as a multi-frequency antenna device.

Furthermore, because the antenna device of this embodiment functions as the inverted-F antenna, size reduction when it is employed as a multi-frequency antenna is enabled and the area of placement into the portable information terminal 100 is also saved.

Fifth Embodiment

Figure 13:
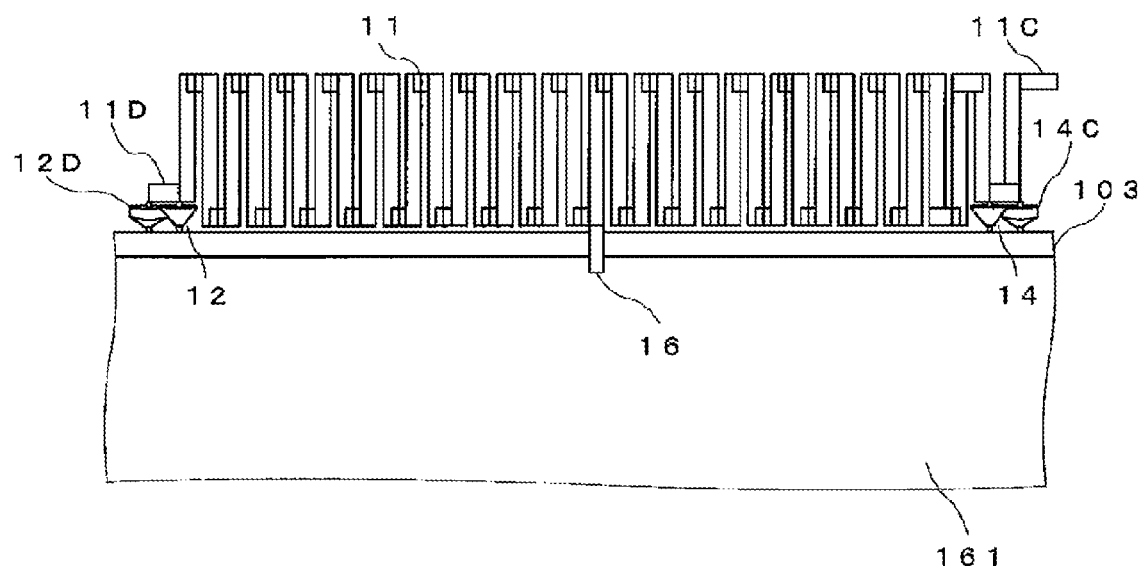
FIG. 13 is an explanatory diagram of the structure of an antenna device according to a fifth embodiment.

FIG. 13 is an explanatory diagram of the structure of an antenna device according to a fifth embodiment. The same constituent element as that in FIG. 4 described in the second embodiment is given the same sign.

In this antenna device, from the feed terminal 14 (12), an element 11C (11D) for another frequency that resonates with a frequency other than the frequency at which resonance is obtained in the antenna element 11 is formed on the same plane as that of the antenna element 11 and in the opposite direction to the feed terminal 12 (14).

A feed terminal 14C is connected to the element 11C for another frequency. Furthermore, a feed terminal 14D is connected to the element 11D for another frequency. These feed terminals 14C and 14D are provided with a communication circuit (diagrammatic representation is omitted) that outputs a radio-frequency signal of a relevant frequency band.

In the example shown in the diagram, the radio-frequency signal fed to the element 11C for another frequency is a signal of a 1.5 [GHz] band and the radio-frequency signal fed to the element 11D for another frequency is a signal of a 5 [GHz] band. The element 11D for another frequency, of the 5 [GHz] band, can be used as a WLAN antenna of a different standard from the 2.4 [GHz] band.

Figure 14:
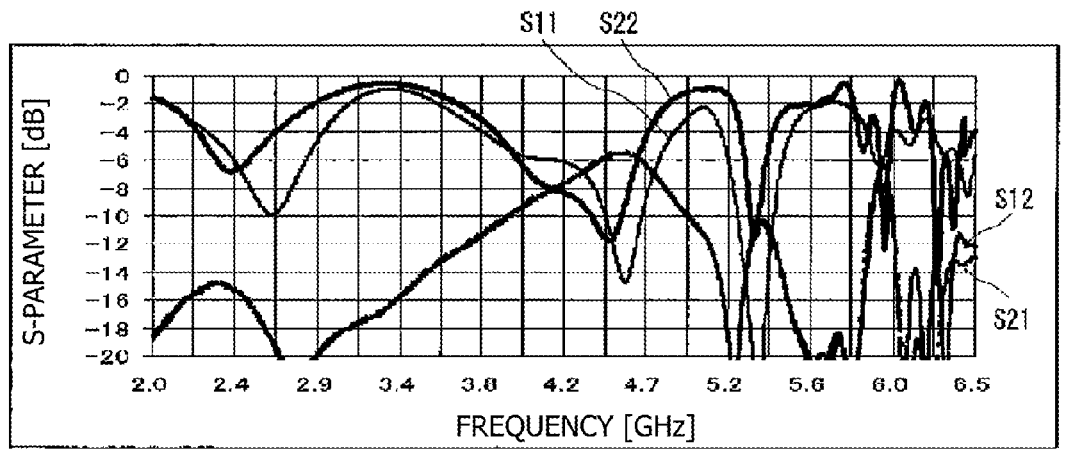
FIG. 14($a$) is a characteristic diagram of the return loss and isolation in an added 1.5 [GHz] band in the antenna device according to the fifth embodiment, FIG. 14($b$) is an enlarged view around 2.4 [GHz], and FIG. 14($c$) is an enlarged view around 2.5 [GHz].
Figure 14:
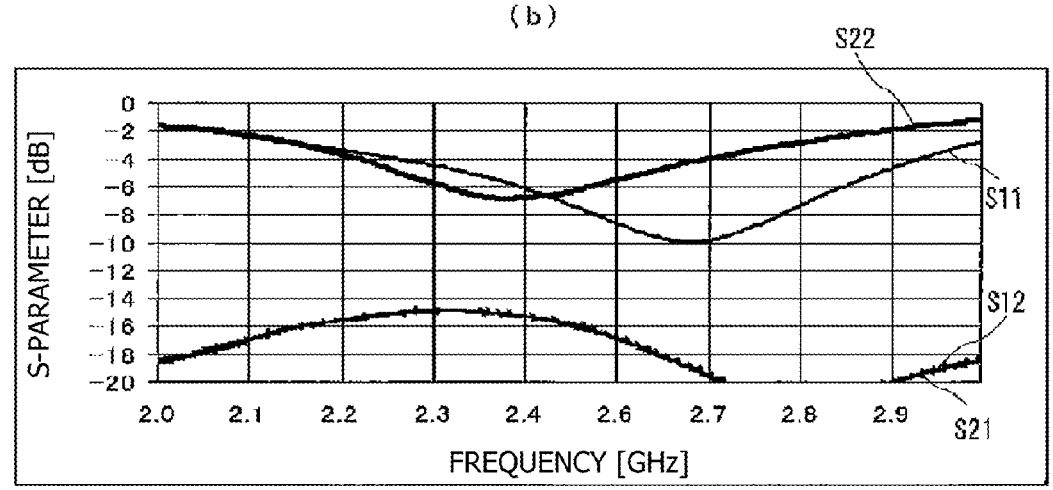
Figure 14:
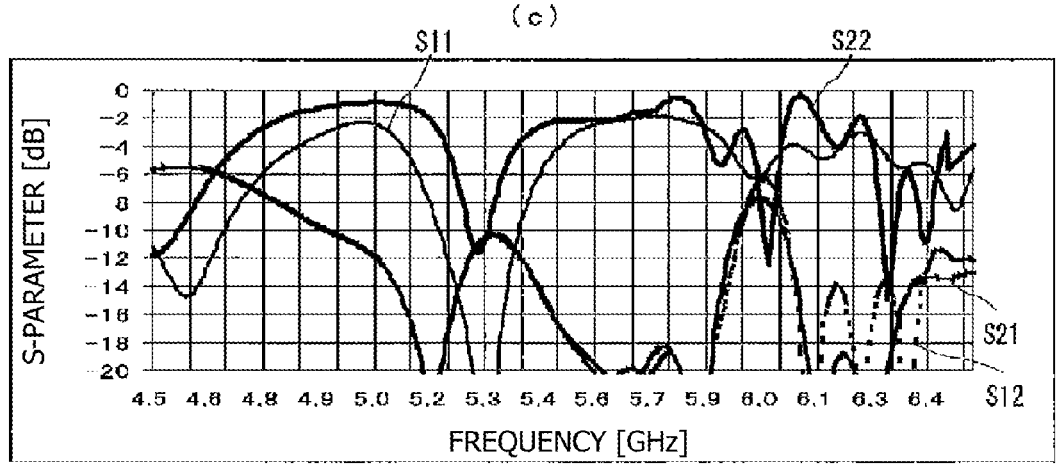

FIG. 14(a) is a characteristic diagram of the return loss and isolation in the 1.5 [GHz] band, which is added as frequencies used in the element 11C for another frequency in the antenna device according to this embodiment. Furthermore, FIG. 14(b) is an enlarged view around 2.4 [GHz] and FIG. 14(c) is an enlarged view around 2.5 [GHz]. In the respective diagrams, the ordinate and abscissa and the S-parameter are the same as those in FIGS. 8(a) and 8(b). The isolation in a 41.4 [GHz] band is equal to or lower than −15 [dB] and it was confirmed that the isolation was in a practical range as the antenna performance.

Figure 15:
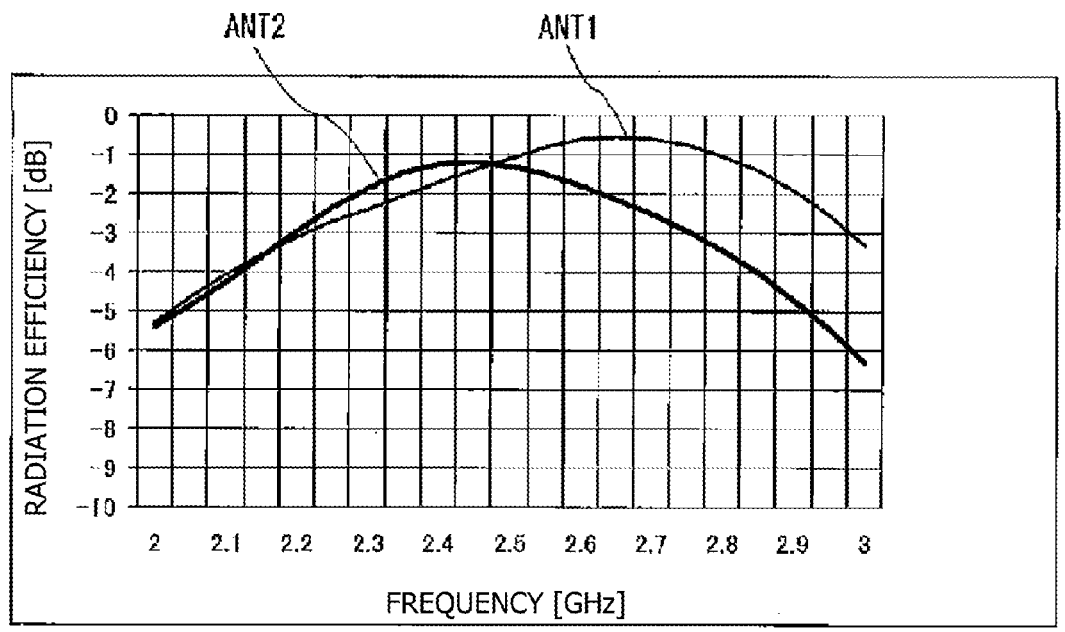
FIG. 15($a$) is a characteristic diagram showing the radiation efficiency around 2.4 [GHz] when 1.5 [GHz] is added and FIG. 15($b$) is a characteristic diagram showing the radiation efficiency around 5 [GHz] when 2.5 [GHz] is added.
Figure 15:
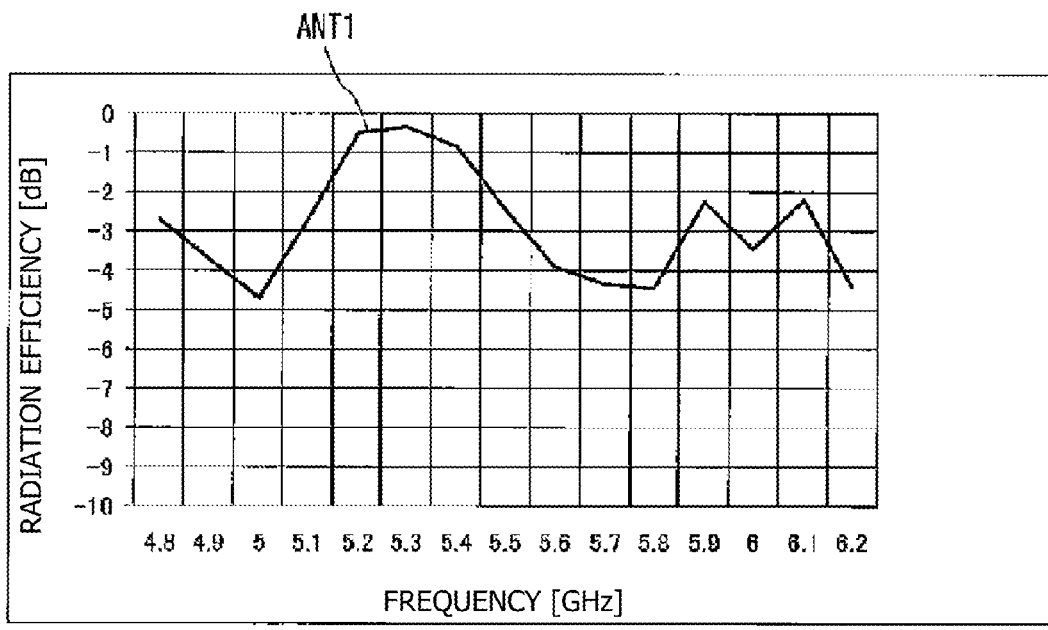

FIG. 15(a) is a characteristic diagram showing the radiation efficiency around 2.4 [GHz] when the 1.5 [GHz] band is added in this antenna device. Furthermore, FIG. 15(b) is a characteristic diagram showing the radiation efficiency around 5 [GHz] when 2.5 [GHz] is added. In the respective diagrams, the ordinate and abscissa and ANT1 and ANT2 are the same as those in FIGS. 8(a) and 8(b).

The radiation efficiency in a 43.4 [GHz] band, which is expected to be frequently used, was −1 to −2 [dB] and the radiation efficiency was equal to or higher than −4 [dB] also in the 5 [GHz] band of the first antenna (ANT1). That is, it was confirmed that the radiation efficiency was in a practical range as the antenna performance even when the element of the 5 [GHz] band (WLAN antenna) was added to the first antenna (ANT1).

As above, by further adding the elements 11C and 11D for another frequency to the antenna element 11, the antenna device can be used as e.g. an antenna device for MIMO (Multiple Input Multiple Output) although having a small size.

Sixth Embodiment

Next, an antenna device of a sixth embodiment will be described. This antenna device is so configured as to be capable of changing the operating frequency band by inserting impedance of various values between the antenna device and a ground surface.

Figure 16:
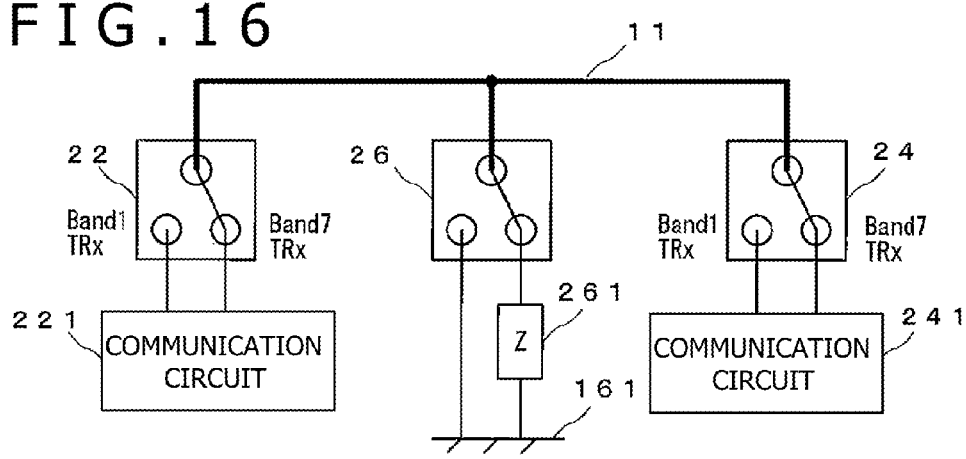
FIG. 16 is a schematic diagram of an antenna device according to a sixth embodiment.

In FIG. 16, feed terminals 22 and 24 and a grounding terminal 26 each serve as a single-pole, double-throw (SPDT) switch and the antenna element 11 is connected to the single-pole parts. The double-throw parts of the feed terminals 22 and 24 are connected to communication circuits 221 and 241, and selection can be made between a transmission/reception port (TRx) of band 1 (2.1 [GHz]) of LTE (Long Term Evolution) and a transmission/reception port (TRx) of band 7 (2.6 [GHz]) for example.

Furthermore, one terminal of the double-throw part of the grounding terminal 26 is connected to the ground surface 161 via impedance (Z) 261. Due to the intervening of the impedance (Z) 261, the electrical length of the antenna element 11 substantially changes.

On the other hand, the other terminal of the double-throw part of the grounding terminal 26 is directly connected to the ground surface 161.

At the time of LTE of band 1, the impedance (Z) 261 is selected. On the other hand, at the time of LTE of band 7, the direct connection to the ground surface 161 is selected. This allows the antenna element 11 to be used as an LTE antenna in two frequency bands although the electrical length of the antenna element 11 is the same.

Figure 17:
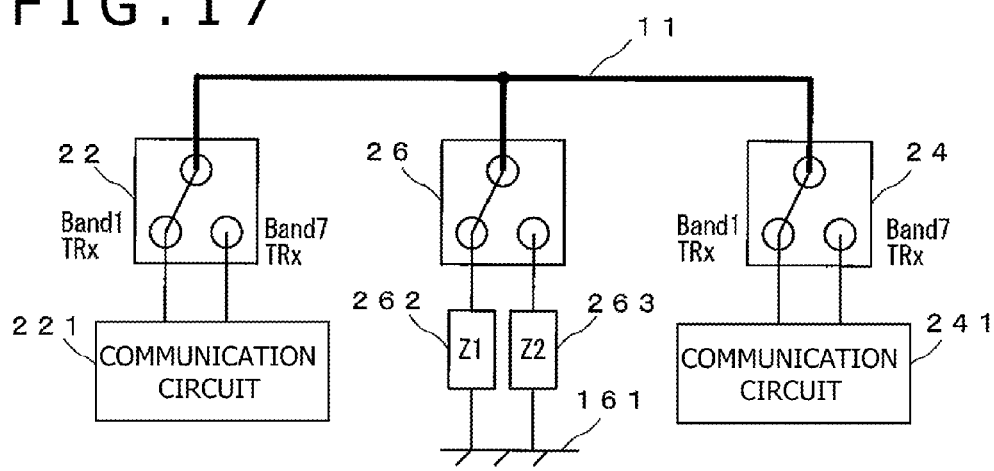
FIG. 17 is a schematic diagram of another antenna device according to the sixth embodiment.

FIG. 17 is a modification example of FIG. 16 and the terminals of the double-throw part of the grounding terminal 26 are connected to the ground surface 161 via impedance (Z1) 262 and impedance (Z2) 263. At the time of LTE of band 1, the impedance (Z1) 261 can be selected. On the other hand, at the time of LTE of band 7, the impedance (Z2) can be selected. By employing SPnT (n is a natural number equal to or larger than 3) as the grounding terminal 26, corresponding frequencies can be increased to n frequency bands.

As above, by inserting impedance of various values between the grounding terminal 26 and the ground surface 161, the antenna element 11 can be easily made to resonate with a radio-frequency signal of a desired frequency fed from the feed terminals 22 and 24 even when the size of the antenna element is the same and even when the connection site of the grounding terminal 26 to the antenna element 11 is fixed. This can dramatically expand the use range of this antenna device.

In the above-described respective embodiments, examples of the case in which the antenna element 11 having a meander shape is used are shown. However, the antenna element 11 may be a monopole antenna or an antenna having any shape along the shape of resin incorporated in the casing of the antenna device 10.

REFERENCE SIGNS LIST

10: Antenna device
11: Antenna element
11A, 11B: Grounded element
11C, 11D: Element for another frequency
12, 14, 21, 24: Feed terminal
16, 26: Grounding terminal
100: Portable information terminal
101: Front-side casing
102: Back-side casing
103: Circuit board
110: Display panel
111, 112, 113, 114: Operation button
121, 141, 221, 241: Communication circuit
122, 142: RF (radio-frequency) module
161: Ground surface (GND)
180: Control unit
1032, 1034, 1036: Spring contact

The invention claimed is:

1. An antenna device comprising:
an antenna element having a first meander line element extending from a first end part and meeting a second end part, opposite from the first end part, the first meander line element extending through an intermediate point between the first and second end parts, and the first meander line element being of a planar conductive material meandering in a plane between the first and second end parts though the intermediate point;
a first feed terminal that is provided at the first end part of the antenna element and feeds a first radio-frequency signal;
a second feed terminal that is provided at the second end part of the antenna element and concurrently feeds a second radio-frequency signal, different from the first radio-frequency signal;
a grounding terminal that connects the intermediate point of the antenna element to a ground surface; and
a second meander line element extending from the first feed terminal in an opposite direction from the first meander line element and away from the second feed terminal, wherein:
the antenna element is placed at a predetermined site on a circuit board that is incorporated in a portable information terminal with the ground surface and an electronic component-mounted surface, and
the grounding terminal electrically communicates with the ground surface, the first feed terminal electrically communicates with a first site on the electronic component-mounted surface, and the second feed terminal electrically communicates with a second site separate from the first site by a size of the antenna element in a longitudinal direction on the electronic component-mounted surface.

2. The antenna device according to claim 1, wherein the first radio-frequency signal and the second radio-frequency signal are radio-frequency signals in a same frequency band.

3. The antenna device according to claim 1, wherein the second meander line element is a grounded element electrically communicating with the ground surface.

4. The antenna device according to claim 1, wherein the second meander line element is an element for another frequency that resonates with a frequency other than frequencies of the first radio-frequency signal and the second radio-frequency signal.

5. The antenna device according to claim 1, wherein the antenna element is placed at a predetermined angle with respect to the circuit board.

6. The antenna device according to claim 5, wherein the plane of the antenna element is co-planar as a plane of the circuit board.

7. The antenna device according to claim 1, wherein
the ground surface is formed on the circuit board,
the antenna element is a film-shaped pattern antenna co-planar with a plane of the ground surface, and
the ground surface is located on the circuit board.

8. The antenna device according to claim 7, wherein a reactance element configured to change an electrical length to the first feed terminal or the second feed terminal intervenes between the grounding terminal and the ground surface.

9. The antenna device according to claim 8, wherein a reactance of the reactance element is variable.

10. A portable information terminal comprising:
a portable casing allowed to be held by an operator with a single hand;
a circuit board on which an electronic circuit including a first communication circuit and a second communication circuit configured to carry out communication in communication forms different from each other is mounted, a ground surface being formed on the circuit board; and
an antenna device capable of being simultaneously fed with a first radio-frequency signal from the first communication circuit and a second radio-frequency signal from the second communication circuit, the antenna device including:
an antenna element having a first meander line element extending from a first end part and meeting a second end part, opposite from the first end part, the first meander line element extending through an intermediate point between the first and second end parts, and the first meander line element being of a planar conductive material meandering in a plane between the first and second end parts though the intermediate point;
a first feed terminal that is provided at the first end part of the antenna element and feeds a first radio-frequency signal;
a second feed terminal that is provided at the second end part of the antenna element and concurrently feeds a second radio-frequency signal, different from the first radio-frequency signal;
a grounding terminal that connects the intermediate point of the antenna element to the ground surface; and
a second meander line element extending from the first feed terminal in an opposite direction from the first meander line element and away from the second feed terminal, wherein:
the antenna element is placed at a predetermined site on the circuit board that is with the ground surface and an electronic component-mounted surface, and
the grounding terminal electrically communicates with the ground surface, the first feed terminal electrically communicates with a first site on the electronic component-mounted surface, and the second feed terminal electrically communicates with a second site separate from the first site by a size of the antenna element in a longitudinal direction on the electronic component-mounted surface.

* * * * *